(12) United States Patent
Markillie et al.

(10) Patent No.: US 8,009,715 B2
(45) Date of Patent: Aug. 30, 2011

(54) MODE SELECTION TECHNIQUE FOR A LASER

(75) Inventors: Gavin Alan James Markillie, Beverley (GB); Jason Robert Lee, Hull (GB)

(73) Assignee: Rofin-Sinar UK Ltd., Willerby (GB)

( * ) Notice: Subject to any disclaimer, the term of this patent is extended or adjusted under 35 U.S.C. 154(b) by 0 days.

(21) Appl. No.: 12/691,557

(22) Filed: Jan. 21, 2010

(65) Prior Publication Data
US 2010/0118898 A1 May 13, 2010

(51) Int. Cl.
*H01S 3/03* (2006.01)

(52) U.S. Cl. ......... 372/64; 372/61; 372/55; 372/92; 372/95; 372/103

(58) Field of Classification Search ......... 372/64, 372/61, 55, 92, 95, 103
See application file for complete search history.

(56) References Cited

U.S. PATENT DOCUMENTS

| | | | |
|---|---|---|---|
| 4,710,941 A | 12/1987 | Sluss et al. | |
| 5,123,028 A | 6/1992 | Hobart et al. | |
| 5,216,689 A | 6/1993 | Gardner et al. | |
| 5,892,782 A | 4/1999 | Vitruk et al. | |
| 6,856,639 B2 | 2/2005 | Dutov et al. | |
| 2003/0058913 A1* | 3/2003 | Shackleton et al. | 372/55 |
| 2004/0105477 A1* | 6/2004 | Dutov et al. | 372/55 |

FOREIGN PATENT DOCUMENTS

| | | |
|---|---|---|
| CN | 1111406 | 11/1995 |
| EP | 0 631 354 | 12/1994 |
| WO | WO 01/48880 | 7/2001 |

OTHER PUBLICATIONS

Search Report under Section 17 for Application No. GB1000969.4 (Apr. 30, 2010).

\* cited by examiner

*Primary Examiner* — Kinam Park
(74) *Attorney, Agent, or Firm* — Jenkins, Wilson, Taylor & Hunt, P.A.

(57) ABSTRACT

A mode selection technique in a laser is described wherein a recess is formed in a surface of a waveguide in the laser. The recess provides a region of free space propagation within the waveguide which preferentially selects the lowest order mode. A mode selective RF excited $CO_2$ slab laser, having a stable resonator in the waveguide dimension and a negative branch unstable resonator in the non-waveguide dimension, is constructed and the position and size of the recess is considered to provide low order mode selection.

15 Claims, 3 Drawing Sheets

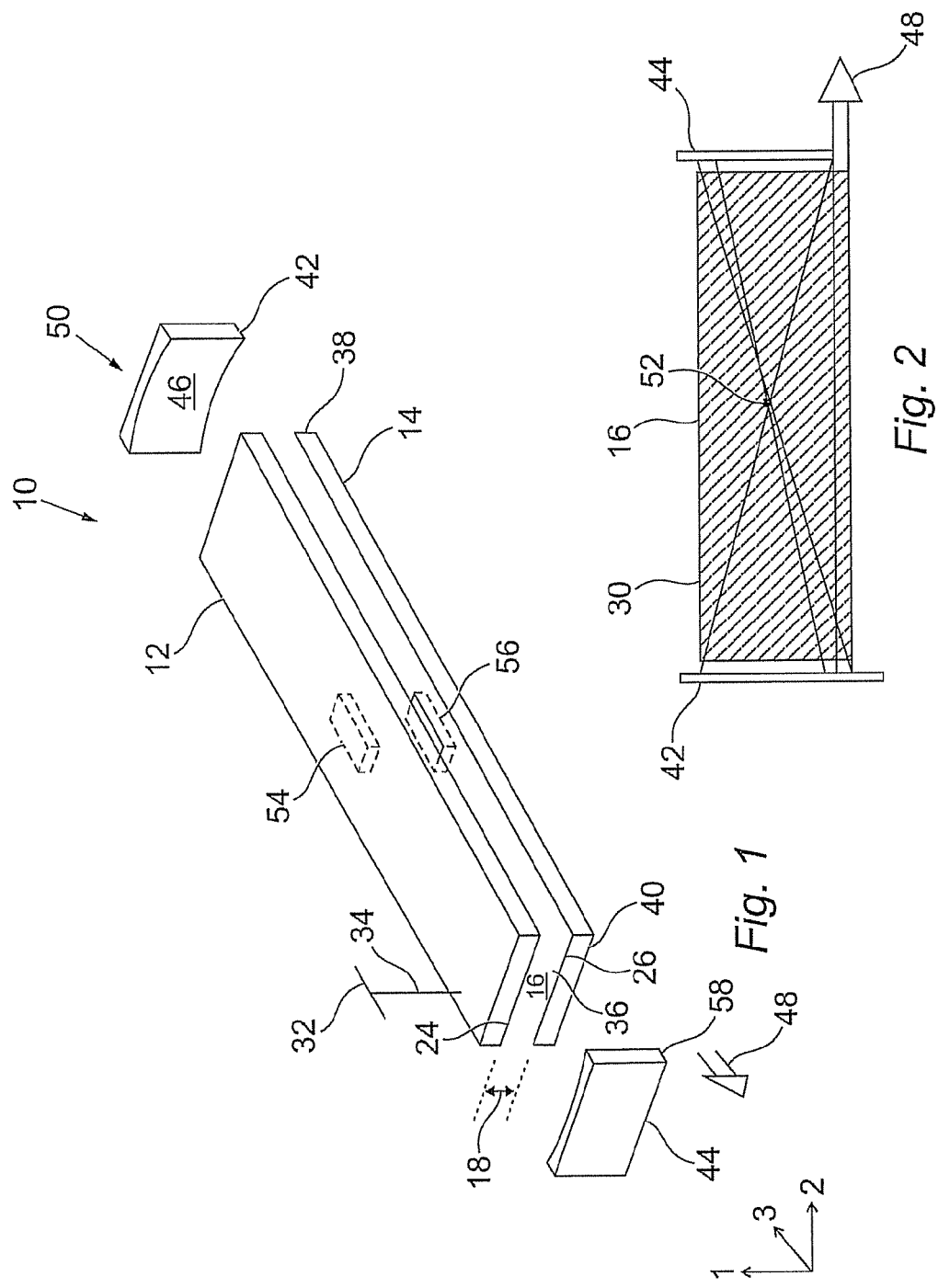

40% duty

PL=10μs    PL=100μs    PL=400μs

40% duty

PL=10μs    PL=100μs    PL=400μs

MODE SELECTION TECHNIQUE FOR A LASER

The present invention relates to a mode selection technique in a laser and more particularly, though not exclusively, to an RF excited $CO_2$ slab waveguide laser where a recess is located on a surface of the waveguide to provide a region of free space propagation within the waveguide. The position and size of the recess can be varied to provide mode selection.

BACKGROUND OF THE INVENTION

A typical RF excited $CO_2$ slab waveguide laser is described in U.S. Pat. No. 5,123,028, assigned to Coherent, Inc., USA. A pair of rectangular planar electrodes having exposed light reflecting surfaces are spaced apart and dimensioned in a manner to guide light i.e. a waveguide, in a plane perpendicular to the reflecting surfaces. Light parallel to the reflecting surfaces is not constrained other than by resonator mirrors located at the ends of the electrodes. The resonator structure is designed as a negative branch unstable resonator in the non-waveguide dimensions. A stable resonator is used in the waveguide dimension but the mirror spacing from the end of the guide is based in part on the configuration of the unstable resonator. More particularly, the electrode length is selected and the mirrors are positioned such that the radius of curvature of the wavefront of the laser beam in the stable waveguide resonant cavity at the mirror location substantially matches the radius of curvature of the mirrors selected for the unstable resonator. Indeed this is true for all lasers; otherwise the path would not self repeat and you would not have a laser. We understand this patent to mean that the wavefront radius of curvature at the mirror surface substantially matches the mirror radius of curvature for the case of a substantially planar wavefront exiting and therefore re-entering the waveguide.

The object of the aforementioned design is to provide a $CO_2$ slab waveguide laser which is stable and generates a high power output for a given length. Further features of the design are noted in respect of having a resonator spaced away from the ends of the waveguide to reduce degradation, having an improved electrode support structure which allows for thermal expansion of the electrodes, an improved cooling system, mirror mounts which allow adjustment from outside the laser housing, a means for pre ionising the discharge and having an electrode support structure which does not confine the discharge. While this design achieved high energies at fast repetition rates, the mode quality provided an $M^2$ of 1.2 in both the waveguide axis and the unstable resonator axis. No further measures were taken to improve the mode quality from the device.

U.S. Pat. No. 6,856,639 assigned to Gosudarstvennoye Predpriyatie Nauchnoissledovatelsky Institut Lazernoy Fizike, Russia and Amada Company, Limited, Japan discloses a high power slab type gas laser. In this patent, they believe that the earlier laser described in U.S. Pat. No. 5,123,028 limited the output power due to the requirement that the electrodes could not be spaced more than 2 mm apart. They considered that the 2 mm restriction was required to generate the fundamental mode in the volume of the narrow, waveguide, axis and consequently, this restriction to the volume of the laser active region reduced the output power that could be obtained.

In U.S. Pat. No. 6,856,639, there is disclosed a gas laser comprising a pair of elongated electrodes arranged to define the discharge region between two opposing surfaces of said elongated electrodes, wherein the discharge region defines a longitudinal axis, a wide axis and a narrow axis. The gas laser further includes a laser gas disposed in said discharge region and an excitation means for energising the electrodes to excite the lasing gas. A first mirror is arranged in front of a first end of the pair elongated electrodes, wherein the first mirror is spaced apart from the first end along the longitude axis by a first distance, and a second mirror is arranged in front of a second end of the pair of elongated electrodes. Moreover, the two opposing electrode surfaces define an electrode curvature, respectively, that is adapted such that a wavefront of the fundamental transverse radiation mode in respect to the narrow axis substantially coincides with the mirror curvature at the first mirror at the first distance.

This arrangement allowed the fundamental transverse mode to operate through the electrodes while allowing the electrodes to have a separation with a minimum gap of approximately 2.5 mm to 3.7 mm. This gap increases to 3.5 mm to 6.00 mm at the ends of the electrodes. While this arrangement achieved good mode selection, this was due to there being no waveguide in the design with free space propagation of the fundamental mode provided in both axes, with an aperture formed between the electrodes to preferentially select the fundamental mode. They did not show that power increased with volume of active laser region. A major disadvantage to this design is that the electrodes are difficult to manufacture as a curvature must be machined to a high tolerance on each of the electrodes. This tolerance must also be applied in the arrangement of the mirrors around the structure and thus any miscalculation or misalignment can substantially affect the quality of the beam output. Additionally, thermal effects will vary the curvature of the electrodes thus affecting the predicted mode quality.

U.S. Pat. No. 5,216,689, being a continuation of the above mentioned U.S. Pat. No. 5,123,028, also considered profiling the electrodes. In one embodiment, extensions are formed at the ends of the electrodes between which the discharge is minimised. The extensions form recombinant surfaces between the ends of the electrodes and the mirrors to quench oxidizing species generated by the discharge before they reach the mirrors. This arrangement is considered to prevent degradation of the mirrors and had no effect on the mode selection performance of the laser.

U.S. Pat. No. 5,892,782, assigned to Synrad Inc., USA describes a laser which includes a split-wave hybrid resonator that produces a high quality laser beam from a low gain laser medium. The split-wave hybrid resonator includes a resonator cavity formed by a pair of resonator mirror surfaces positioned at opposite ends of the laser medium and a pair of resonator walls positioned on opposite sides of the resonator cavity. The resonator walls are separated from each other by a separation distance such that the resonator cavity has a Fresnel number between approximately 0.5 and 1.5.

At least one of the resonator walls includes a first ring oscillation filter adjacent to the lasing medium to filter out ring oscillations within the laser medium. This filter may take the form of a recess formed in one or both resonator walls. One or more of the resonator walls may include first and second wall portions angled with respect to each other to form a wave-front splitting interferometer. The resonator mirrors are tilted off-axis with respect to the resonator walls. This laser does not have electrodes arranged to form a waveguide. Additionally, the filter acts to stop a parasite rather than give mode selection.

U.S. Pat. No. 4,710,941, assigned to The United States of America as represented by the Secretary of the Army, describes a CW $CO_2$ waveguide laser in which the electrodes have been profiled or more particularly machined to provide a plurality of apertures therein equally spaced along the electrodes. These perforated electrode structures are used to permit a large number of excited molecules normally trapped between the exciting electrodes to escape, allowing ground state molecules to enter and be pumped to their upper lasing level, thereby increasing the population inversion and efficiency of the laser. The apertures in this arrangement are of pinhole dimensions and are arranged in order that they do not influence the discharge or beam quality. The apertures do not provide any mode selection to the laser.

It is an object of at least one embodiment of the present invention to provide a laser in which the fundamental mode is preferentially selected.

It is a further object of at least one embodiment of the present invention to provide a laser of a known configuration in which a recess is provided in at least one of the surfaces of a waveguide.

It is a yet further object of at least one embodiment of the present invention to provide a method of constructing a mode selective laser.

SUMMARY OF THE INVENTION

According to a first aspect of the present invention there is provided a laser comprising first and second surfaces separated to form a waveguide on a first axis between said surfaces; a discharge region contained within at least a portion of said waveguide; a resonant cavity having a propagation axis orthogonal to said first axis; and characterised in that a recess is located on at least one of said surfaces, said recess being configured to create a region within said waveguide in which free space propagation occurs in the direction of said first axis.

In this way, the wavefront exits and re-enters the waveguide within the discharge region on the propagation axis. There is no requirement that the wavefront radius of curvature is substantially planar exiting and therefore re-entering the waveguide.

The recess may be in the form of a slot, circular hole or other shape that acts to produce lowest order waveguide mode selection within the confines of the discharge region, by creating an internal region where the transverse mode experiences free space propagation as opposed to waveguiding in the first axis. By selecting a length of the recess in the propagation axis, mode selection can be achieved.

Preferably, the recess has a length along the propagation axis in the range 0.1 to 1 Rayleigh range. The Raleigh range is defined as the distance required for the lowest order waveguide mode entering free space for its second order moment beam width to increase by a factor of the square root of two by the effects of diffraction.

Preferably, the height of the waveguide on the first axis is in the range 1 mm to 4 mm. This provides a strip shaped discharge. It also lends itself to being a slab laser where the height represents an inter-electrode gap. Advantageously, the height of the waveguide is in the range 1.3 mm to 2.8 mm.

Preferably, the recess has a depth greater than one twentieth of the height of the waveguide. Alternatively, the depth is greater than one fortieth of the length of the recess. The depth is selected to prevent secondary bounces from the bottom of the recess back into the waveguide. Thus the depth is chosen to provide a stable discharge with no unwanted reflection or completely suppress the discharge while preventing unwanted reflection back into the waveguide. In an embodiment of the present invention, the depth is infinite creating an aperture or hole through the at least one surface of the waveguide. Such an aperture or hole may be through an electrode.

Advantageously, the recess is provided on the first surface and a further recess if provided on the opposing second surface of the waveguide. Thus the recess provides a symmetrical region on the propagation axis. The first and second surfaces may be oppositely arranged electrode surfaces. Alternatively, the first and second surfaces may be oppositely arranged side walls of the discharge region e.g. recesses located in ceramic spacers.

Preferably, the resonant cavity is an unstable resonator in an axis orthogonal to the first axis giving a forward wave mode and a reverse wave mode, and wherein said reverse wave mode has a beam waist. The cavity may be considered as a negative branch resonator. In an embodiment, this resonant cavity provides a hybrid planar waveguide laser.

Preferably, the recess is located upon an optical axis of the unstable resonator. In this way the recess is aligned with the propagation axis to ensure the wave mode is influenced. More preferably, the recess is located substantially upon the beam waist. Advantageously also, the recess has a width such that over a majority of its length, between one half and all of the reverse wave mode is overlapped by the recess.

Preferably, the discharge region is created between first and second elongate electrodes with an inter-electrode gap equal to the height of said waveguide. In this way a recess can be machined into a surface of one or both electrodes. Preferably, the recess is entirely bounded by the discharge region and is thus created within the discharge region. Alternatively a majority of the recess may be bounded by the discharge region. In this way, the recess may be located at an end of the waveguide. The ends of the waveguide may comprise ceramic surfaces as are known in the art.

In an embodiment of the present invention, the discharge is an RF excited $CO_2$ laser gas. This provides an opportunity to have a sealed laser.

According to a second aspect of the present invention there is provided a method of providing a mode selective laser, comprising the steps:
 (a) providing first and second surfaces which can be arranged to form a waveguide therebetween;
 (b) machining a recess in at least one of said surfaces of said waveguide;
 (c) providing a resonant cavity around said waveguide; and
 (d) creating a gas discharge within at least a portion of said waveguide.

Other features may be as described with respect to the first aspect.

Preferably the laser is an RF excited $CO_2$ slab laser with a negative branch resonator.

BRIEF DESCRIPTION OF THE DRAWINGS

Embodiments of the present invention will now be described, by way of example only, in which:

FIG. 1 is a schematic illustration of a mode selective laser according to an embodiment of the present invention;

FIG. 2 is a cross sectional view through a part of a mode selective laser illustrating the unstable resonator cavity according to a further embodiment of the present invention;

DETAILED DESCRIPTION OF THE INVENTION

Figures 3A, 3B, 3C, 3D:
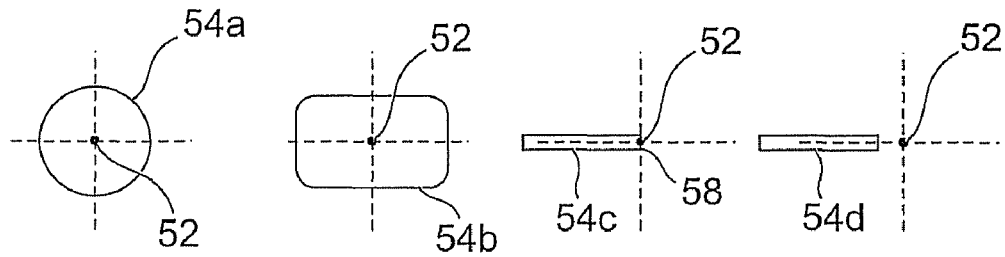
FIGS. 3(a)-(d) provide illustrations of recesses for use in the laser of FIG. 2.

Reference is initially made to FIG. 1 of the drawings which illustrates a mode selective laser, generally indicated by reference numeral 10, according to an embodiment of the present invention. Laser 10 comprises a pair of elongated rectangular planar electrodes 12,14 formed from a conductive metal such as aluminium. The planar dimensions of electrodes 12,14 will determine the size of the discharge region 16, created there between, and consequently the output power of the laser 10. For a 100 w laser in $CO_2$ the electrodes could be around 480 mm in length and 45 mm wide. The electrodes 12,14 are typically adapted to include one or more coolant channels (not shown) through which water can flow.

The electrodes 12,14 are spaced apart by a waveguide height, or inter-electrode gap 18. Typically the gap 18 is 1 mm to 4 mm in height, with a height in the range 1.3 mm to 2.8 mm in a preferred embodiment. The electrodes 12,14 are held apart at the desired height 18.

The discharge region 16 is then confined within first and second waveguide surfaces 24,26. This provides a cross-sectional area with no boundaries defined by the gap 18 on a first axis and the electrodes surface width on a second axis, orthogonal to the first axis. A third axis, orthogonal to the first and second axes defines the propagation direction through the discharge region 16.

As is known in the art, the electrodes are excited from a radiofrequency, RF, generator 32 which is impedance matched to the electrodes 12,14, via a network 34. The discharge 16 is created by excitation of a laser gas 36 located between the electrodes 12,14. In the preferred embodiment, the laser gas 36 is a standard $CO_2$ mix of helium, nitrogen, and carbon dioxide in the ratio 3:1:1, with an additional 5% xenon, at a fill pressure of 100 to 150 mbar. The output is at a principal wavelength of 10.6 microns. The arrangement is sealed within a housing (not shown).

At either end 38,40 of the electrodes 12,14, there is arranged a pair of mirrors 42,44. Each mirror 42,44 is fixed to a mount (not shown) which can be made adjustable from outside the housing, if desired. The mirrors 42,44 are typically formed from a silicon or copper substrate which is coated, firstly, with gold or silver, and, secondly, with a dielectric stack of thorium fluoride and zinc sulphide. An additional coating of thorium fluoride or, preferably, germanium is applied. The back mirror 42 is sized to provide a reflective surface 46, which fills the discharge region 16, so that all light from the end 38 is reflected back into the region 16. The front mirror 44, is shorter, so that a portion of light 48 is coupled, passed the mirror hard edge 58, out of the resonator 50 as the laser output.

Mirrors 42,44 are selected to provide a negative branch unstable resonator 50 in the second axis. This is best illustrated in FIG. 2. The back or rear mirror 42 is spherical with a radius of curvature of 515 mm and the front mirror or output coupler 44 is also spherical with a radius of curvature of 453 mm. In this arrangement a beam waist is formed in the discharge region 16.

Figure 6A:
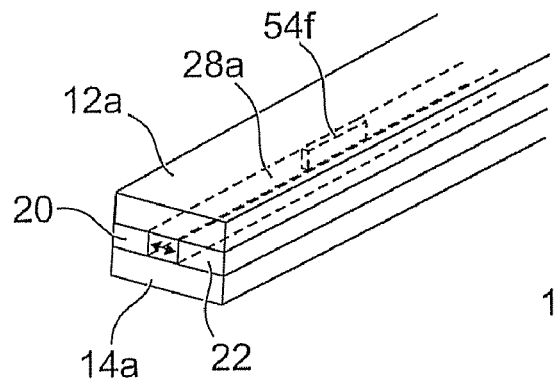
FIGS. 6(a)-(d) illustrate electrode arrangements suitable for use in further embodiments of the present invention.
Figure 6B:
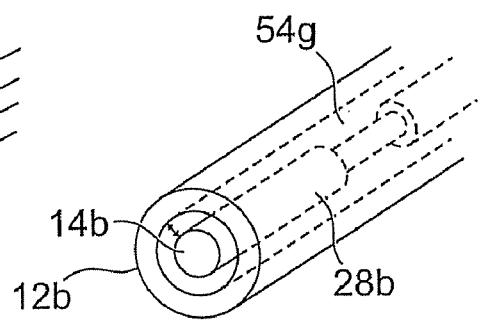
Figure 6C:
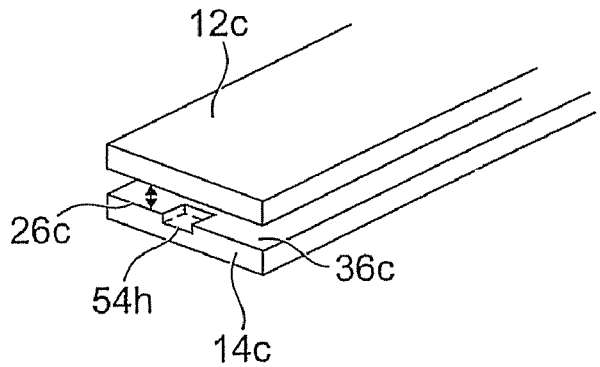
Figure 6D:
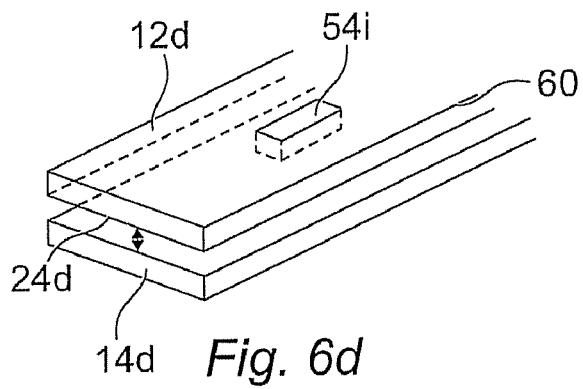

In the present invention, laser 10 also includes a recess 54 machined into an electrode 12. In the embodiment shown a matching recess 56 is machined into the opposing electrode 14, with each recess 54,56 being arranged on a waveguide surface 24,26 respectively. The recess 54 is entirely bounded by the waveguide surface 24. In other embodiments the recess may be substantially bounded by the waveguide surface 24. This recess 54 can be considered as a hole cut out of the waveguide surface which extends the waveguide height in the first axis. Indeed, the recess can be formed as a hole through the electrode, in an embodiment of the present invention, as shown in FIG. 6(d).

The dimensions and location of the recess 54 will determine the mode selection in the laser 10. In the negative branch unstable resonator 50, a confocal point 52 is generated and its location is used to determine the position of the recess 54 located in an electrode 12. Reference is now made to FIG. 3 which illustrates a selection of recesses of differing shape and dimensions and their position with reference to the confocal point 48 of the resonator 50.

In FIG. 3(a) a circular recess 54a is illustrated with a diameter of 15 mm. This has been selected for the resonator arrangement shown in FIG. 2. The recess 54a has a depth of 3 mm. The depth is selected to provide free space propagation in the first axis i.e. a wave front in the waveguide 18 will find a wider path at the recess 54a and, as a result, free space propagation will occur on the propagation axis along the length of the recess which is parallel with the propagation axis or third axis. At each end of the recess 54a, on the third axis, the wave front will be attenuated as only a portion will pass into the reduced waveguide/first axis. This attenuation is believed to preferentially select the lowest order waveguide mode.

FIG. 3(b) illustrates a recess 54b having a substantially rectangular or lozenge shape. This recess 54b, which may also be considered as a slot, is positioned centrally at the confocal point 52. Recess 54a is also centred at the confocal point. Recess 54b has dimensions of 15 mm on the second axis and 25 mm on the third axis. The depth is kept at 3 mm.

FIG. 3(c) is a narrower recess 54c with a reduced length on the second axis to 4 mm and on the third axis to 15 mm. Recess 54c is also moved so that a first wall 58 is located symmetrically on the confocal point 52. The recess 54c is directed towards the rear mirror 42. The depth is kept to the 3 mm described earlier.

FIG. 3(d) shows a recess 54d having the same dimensions as the recess 54c but is positioned 5 mm from the confocal point 52 towards the rear mirror 42.

Each recess 54, is selected to provide repeatable mode selection acting over the entire width of the beam in the focussed direction only. Typically the recess 54 will be located symmetrically with respect to the optic axis and the intracavity focus i.e. confocal point. It is thus necessary to first design the unstable resonator 50 to determine the desired output for the discharge region 16. In contrast to U.S. Pat. No. 5,123,028, it should be noted that a planar wavefront is not required at the ends of the waveguide and so spherical mirrors can still be used, but now in a configuration where they can be chosen to be much closer to the ends of the waveguide. This will provide the mirror 22,24 characteristics and positions together with the discharge dimensions and gap 18. Such a geometrical approach will determine the confocal point 52, the beam waist, the geometrical hard edge location and the location of the optical axis.

With the resonator 50 defined, the recess 54 dimensions can be determined. The recess 54 will be positioned symmetrically across the optical axis and relative to the intracavity focus i.e. confocal point 52. The recess 54 is located substantially upon the beam waist position and has a width such that over a majority of its length, between one half and all of the reverse wave mode is overlapped by the recess. This can be calculated from a combination of geometric and diffractive optics.

The recess 54 length on the third axis is chosen to provide sufficient mode selection. It is known that the Rayleigh range is the distance required for the lowest order waveguide mode entering free space for its second order moment beam width to increase by a factor of the square root of two by the effects of diffraction. Using combination of geometric and diffractive optics, the recess is selected to have a length along the third axis in the range 0.1 to 1 Rayleigh range. It has been found that a length of around 15 mm for the laser resonator described hereinbefore provides sufficient mode selection.

The recess 54 width on the second axis is selected to provide sufficient tolerance to misalignment of the mirrors 22,24. As the tilt of the mirrors will affect the beam width and location, this misalignment is taken into consideration in the width of the recess 54 to ensure that desired mode selection occurs in the second axis to tolerable limits. This is in contrast to the laser described in U.S. Pat. No. 6,856,639 which had little tolerance as the electrodes had to match the beam dimensions. Here a trade off can be achieved between the output power and the width of the recess to allow for misalignments. In the preferred embodiment the width is selected as 4 mm.

Finally the depth of the recess 54 is determined. The depth can be chosen to either (a) completely suppress the discharge whilst preventing unwanted reflection back into the waveguide or (b) allow a stable discharge with no unwanted reflection. It has been found that, for the preferred embodiment, a depth of 0.5 mm prevents secondary bounces for recess lengths of approximately 100 mm whilst allowing a stable discharge to operate. A trade off is required as a deep recess may result in an unstable discharge while a shallower recess will allow secondary bounces. A depth greater than one twentieth of the gap 18 and/or a depth greater than one fortieth of the recess length are appropriate. However, for a slab laser at least, the recess can extend entirely through the waveguide wall or electrode to completely suppress the discharge while providing no reflective surface for bounces. Additionally, as the recess 54 will cause discharge instability, enhanced impedance matching 34 may be required. Such an enhancement may be in an increase in the number of coils arranged between the electrodes 12,14.

Figure 4:
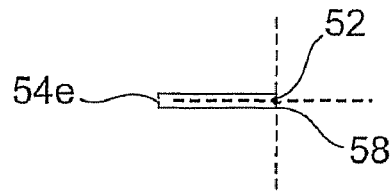
FIG. 4 is an illustration of a recess selected according to a preferred embodiment of the present invention.

Reference is now made to FIG. 4 of the drawings which illustrates a recess 54e, according to a preferred embodiment of the present invention. Recess 54e has a first wall 58 arranged symmetrically on the confocal point 52 and the optical axis. The recess 54e is directed towards the rear mirror 42. The recess 54e has a length of 15 mm and a width of 4 mm which is calculated to contain almost all the free space mode, while allowing for some misalignment. The depth is reduced to 0.5 mm. An identical recess 56 is machined into the opposing waveguide surface 24 so that the recesses 54,56 lie directly opposite each other. The recess 54,56 sizes can be selected so that they lie on the centre of the electrodes while also performing the required waveguide mode selection on the optical axis. In this arrangement the electrodes can have the same design thus saving on manufacturing costs.

Figure 5A:
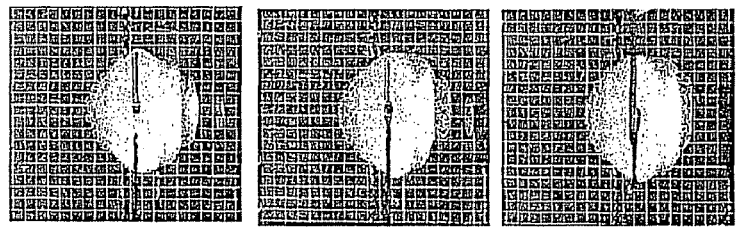
FIG. 5 illustrates laser mode variations for differing pulse lengths on (a) laser including elongate planar electrodes and (b) the laser wherein a recess is formed on each of the planar electrodes.
Figure 5B:
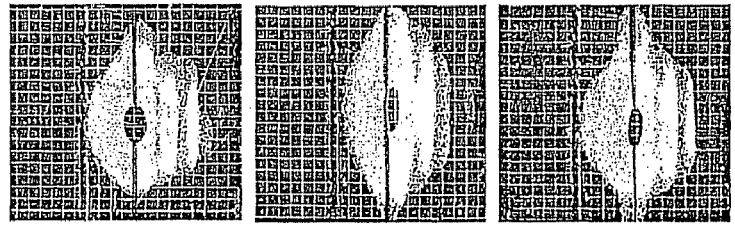

FIGS. 5(a) and 5(b) show an the output mode for the laser 10 described above wherein the laser of FIG. 5(a) is as the laser presented in FIG. 2 without a recess and FIG. 5(b) shows results for the same laser, now with a pair of recesses 54,56 as described for FIG. 4. For these results, the laser 10 was operated as described at FIG. 1, with pulse lengths of 10 μs, 100 μs and 400 μs at 40% duty. In both cases the wavelength was all in the 10P branch for 10.6 μm. The waveguide mode in the laser arrangement having no recess, FIG. 5(a) showed large variations over the pulse lengths whereas with the recess, the waveguide mode was stable over all pulse lengths. As can be seen, improved mode selection is achieved in the arrangement for FIG. 5(b).

While the present invention is shown with application to a slab laser having a waveguide dimension between the electrodes, the recess can be incorporated in other gain medium configurations to provide mode selection. Reference is now made to FIG. 6 of the drawings which illustrates a selection of gain medium configurations suitable for inclusion of the recess of the present invention. FIG. 6(a) provides a waveguide arrangement wherein the waveguide axis is determined from the distance between the spacers 20a,22a. The recess 54f is located on a side wall 28a being machined into the ceramic dielectric. FIG. 6(b) is an annular arrangement wherein the waveguide axis is between inner 12b and outer 14b cylindrical electrodes. The recess 54g is located on the surface 28b of the inner electrode 12b. In FIG. 6(c) a slab arrangement is illustrated but the recess 54h has been located at the end 36c of the electrode 14c. A majority of the recess 54h is bounded by the waveguide surface 26c as the discharge is created on three sides of the recess 54h. FIG. 6(d) also illustrates a slab configuration. In this embodiment the recess 54i is formed through the electrode 12d, providing an aperture extending from the waveguide surface 24d to the outer surface 60. The discharge will be entirely suppressed at the location of the recess 54i. It will be appreciated that these examples are not exhaustive.

A principal advantage of the present invention is that it provides a laser in which the lowest order mode is preferentially selected.

A further advantage of the present invention is that current laser configurations can be modified, by incorporating a recess, to achieve mode selection.

It is a yet further advantage of the present invention is that it provides a method of producing a mode selective laser which is relatively simple and can be implemented at low cost.

Modifications may be made to the invention herein described without departing from the scope thereof. For example, the recess may form any shape and could be shaped to ideally match the beam waist or form at the position of the recess. The recess can be arranged at any position on the propagation axis. While the present invention is described with reference to a $CO_2$ slab laser, the invention will find application in other lasers of other gas discharge, solid state material, semiconductor material or liquid dye types.

The invention claimed is:

1. A laser comprising:
   first and second parallel surfaces separated to form a waveguide on a first axis between said surfaces;
   a discharge region contained within at least a portion of said waveguide;
   a resonant cavity having a propagation axis orthogonal to said first axis;
   characterised in that:
   a recess is located on at least one of said surfaces, said recess being configured to create a region within said waveguide in which free space propagation occurs in the direction of said first axis.

2. A laser according to claim 1 wherein said recess has a length along said propagation axis in the range 0.1 to 1 Rayleigh range.

3. A laser according to claim 1 wherein a height of said waveguide on said first axis is in the range 1 mm to 4 mm.

4. A laser according to claim 3 wherein said height of said waveguide is in the range 1.3 mm to 2.8 mm.

5. A laser according to claim 3 wherein said recess has a depth greater than one twentieth of said height.

6. A laser according to claim 5 wherein said depth is infinite.

7. A laser according to claim 1 wherein said recess is provided on said first surface and a further recess is provided on said second surface.

8. A laser according to claim 1 wherein said resonant cavity is an unstable resonator in an axis orthogonal to said first axis giving a forward wave mode and a reverse wave mode, and wherein said reverse wave mode has a beam waist.

9. A laser according to claim 8 wherein said recess is located upon an optical axis of said unstable resonator.

10. A laser according to claim 8 wherein said recess is located substantially upon said beam waist.

11. A laser according to claim 8 wherein said recess has a width such that over a majority of a length of said recess, between one half and all of said reverse wave mode is overlapped by said recess.

12. A laser according to claim 3 wherein said discharge region is created between first and second elongate electrodes with an inter-electrode gap equal to said height of said waveguide.

13. A laser according to claim 1 wherein said discharge is an RF excited $CO_2$ laser gas.

14. A method of providing a mode selective laser, comprising the steps:
 (a) providing first and second parallel surfaces which can be arranged to form a waveguide therebetween;
 (b) machining a recess in at least one of said surfaces of said waveguide;
 (c) providing a resonant cavity around said waveguide; and
 (d) creating a gas discharge within at least a portion of said waveguide.

15. A method according to claim 14, wherein said laser is an RF excited $CO_2$ slab laser with a negative branch resonator.

* * * * *